(12) United States Patent
Huang et al.

(10) Patent No.: US 10,664,693 B2
(45) Date of Patent: May 26, 2020

(54) METHOD, DEVICE, AND SYSTEM FOR ADDING CONTACTS IN SOCIAL NETWORK

(71) Applicant: TENCENT TECHNOLOGY (SHENZHEN) COMPANY LIMITED, Shenzhen (CN)

(72) Inventors: Feiyue Huang, Shenzhen (CN); Jilin Li, Shenzhen (CN); Chengjie Wang, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 80 days.

(21) Appl. No.: 15/950,929

(22) Filed: Apr. 11, 2018

(65) Prior Publication Data
US 2018/0232570 A1 Aug. 16, 2018

Related U.S. Application Data

(63) Continuation of application No. PCT/CN2017/074357, filed on Feb. 22, 2017.

(30) Foreign Application Priority Data

Mar. 2, 2016 (CN) .......................... 2016 1 0117759

(51) Int. Cl.
*G06K 9/00* (2006.01)
*H04L 29/06* (2006.01)
(Continued)

(52) U.S. Cl.
CPC ..... *G06K 9/00362* (2013.01); *G06F 16/9537* (2019.01); *G06K 9/00677* (2013.01);
(Continued)

(58) Field of Classification Search
CPC .. G06K 9/00362; G06F 16/9537; H04L 63/08
See application file for complete search history.

(56) References Cited

U.S. PATENT DOCUMENTS

| | | | |
|---|---|---|---|
| 2009/0196509 A1* | 8/2009 | Farrer ................ | G06K 9/00221 382/209 |
| 2014/0108501 A1* | 4/2014 | Papakipos ............ | G06F 16/583 709/203 |

(Continued)

FOREIGN PATENT DOCUMENTS

| | | |
|---|---|---|
| CN | 102355534 A | 2/2012 |
| CN | 103324636 A | 9/2013 |
| CN | 104243276 A | 12/2014 |

OTHER PUBLICATIONS

International Search Report dated May 4, 2017 in PCT/CN2017/074357 with English translation therein.

*Primary Examiner* — David F Dunphy
(74) *Attorney, Agent, or Firm* — Oblon, McClelland, Maier & Neustadt, L.L.P.

(57) ABSTRACT

Aspects of the disclosure provide a method for adding a target contact to a user's friend list in a social network. A target image of a human body part of the target contact can be received from a user terminal. A target biological feature can be extracted from the target image. Whether the target biological feature matches a reference biological feature of a plurality of prestored reference biological features can be determined. A social account associated with the determined reference biological feature that matches the target biological feature may be determined, and added to the user's friend list.

20 Claims, 5 Drawing Sheets

(51) Int. Cl.
*G06F 16/9537* (2019.01)
*G06K 9/46* (2006.01)
*H04L 29/08* (2006.01)
*G06Q 50/00* (2012.01)

(52) U.S. Cl.
CPC ............... *G06K 9/46* (2013.01); *H04L 63/08* (2013.01); *H04L 63/104* (2013.01); *H04L 67/1044* (2013.01); *G06Q 50/01* (2013.01); *H04L 63/0861* (2013.01)

(56) References Cited

U.S. PATENT DOCUMENTS

2014/0301612 A1* 10/2014 Cha .................... G06K 9/00677
382/118
2014/0333746 A1* 11/2014 Huang .................. G06Q 50/01
348/77

* cited by examiner

METHOD, DEVICE, AND SYSTEM FOR ADDING CONTACTS IN SOCIAL NETWORK

RELATED APPLICATION

This application is a continuation of International Application No. PCT/CN2017/074357, filed on Feb. 22, 2017, which claims priority to Chinese Patent Application No. 201610117759.7, entitled "METHOD, DEVICE, AND SYSTEM FOR ADDING CONTACTS IN SOCIAL NETWORK" filed with the Chinese Patent Office on Mar. 2, 2016. The entire disclosures of the prior applications are hereby incorporated by reference in their entirety.

FIELD OF THE TECHNOLOGY

This application relates to adding contacts in a social network.

BACKGROUND OF THE DISCLOSURE

Currently, online social networking has become popular in people's daily life. There is a frequent need to add contacts in online social networking, such as adding friends when meeting face to face, creating and adding a group, or building a following relationship of an official account. The most common method to add contacts is to ask for a social network account (for example, a QQ account, a Wechat account, a Weibo account, and a Facebook account) of the other side and manually input the obtained social account to add contacts. This adding method is straightforward, but has some disadvantages. For example, a social account having long characters needs to be repeatedly confirmed, and people having bad memory may incompletely input characters. Further, for a user having difficulty in speaking English, it is difficult to pronounce an account including English letters clearly. Moreover, some user groups have poor knowledge about English letters because of problems such as age and education. For these users, there is a huge usage problem when adding a social account including English letters. In addition, when an account both has letters and numbers, a user needs to frequently switch a keyboard input method when using a social application of a mobile terminal to input the account, consequently reducing efficiency of adding contacts and worsening a user experience of adding contacts.

SUMMARY

Aspects of the disclosure provide a method for adding a target contact to a user's friend list in a social network. A target image of a human body part of the target contact is received from a user terminal. A target biological feature is extracted from the target image. Whether the target biological feature matches a reference biological feature of a plurality of prestored reference biological features is determined. A social account associated with the determined reference biological feature that matches the target biological feature is determined. Further, the determined social account of the target contact is added to the user's friend list.

Aspects of the disclosure provide a non-transitory computer-readable medium storing a program. The program can be executable by a processor to perform collecting a target image of a human body part of a target contact in order to add the target contact to a user's friend list in a social network. The target image is provided to a server. The server extracts a biological feature from the target image, determines a social account associated with the extracted biological feature based on a database storing associations between biological features and respective associated social accounts, and adds the determined social account to the user's friend list.

Aspects of the disclosure provide an information processing apparatus. The information processing apparatus includes circuitry that is configured to receive a target image of a human body part of a target contact from a user terminal, and extract a target biological feature from the target image. The circuitry is further configured to determine whether the target biological feature matches a reference biological feature of a plurality of prestored reference biological features, and determine a social account associated with the determined reference biological feature that matches the target biological feature. The circuitry adds the determined social account of the target contact to the user's friend list.

In embodiments of the disclosure, a user does not need to memorize a social account of a target contact or manually input the social account of the target contact in order to add the target contact to the user's friend list. The user can obtain a target image of a human body part of the target contact and transmit the target image to a social network server with a user terminal. The target contact can be then added to the user's friend list automatically. The target image can be captured by scanning the human body part of the target contact or by shooting an image of the human body part of the target contact, thereby greatly simplifying the process of adding the target contact and improving efficiency of adding contacts. The method is appropriate to usage of people inconvenient to perform manual inputting, such as old people, disabled people, or children.

BRIEF DESCRIPTION OF THE DRAWINGS

To illustrate the technical solutions in the embodiments of this application, the following briefly describes the accompanying drawings required for describing the embodiments. The accompanying drawings in the following description merely show some embodiments of this application, and a person of ordinary skill in the art can derive other drawings from these accompanying drawings.

DESCRIPTION OF EMBODIMENTS

To make the objective, technical solutions, and advantages of this application more clear, the following embodiments further describe this application in detail.

For the purpose of brief and intuitive description, the following describes solutions of this application by describing several representative implementation manners. A large number of details in the implementation manners are used to help understand the solutions of this application. However, implementation of the technical solutions of this application is not limited to these details. In the following description, "including" means "including, but not limited to", and "according to . . . " means "at least according to . . . , but the basis is not limited to . . . ".

Figure 1:
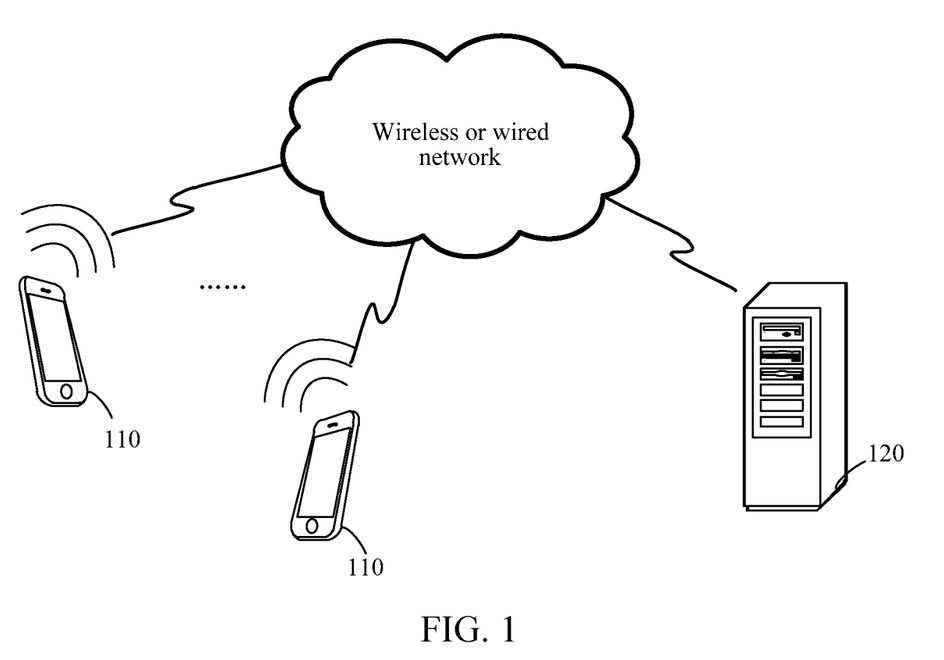
FIG. 1 is a schematic structural diagram of an implementation environment according to embodiments of this application.

FIG. 1 is a schematic structural diagram of an implementation environment according to embodiments of this application. As shown in FIG. 1, the implementation environment includes a user terminal 110 and a server 120.

The user terminal 110 includes a social application client corresponding to a social network. The user terminal 110 may be a smartphone, a tablet, a laptop, a desktop computer, or the like. The social application client may be various social network software or social network platforms, such as a Wechat client, a QQ client, a Weibo client, and a Facebook client.

The user terminal 110 and the server 120 may be connected to each other by using a wireless network or a wired network.

The server 120 may be one server, or a server cluster formed by a plurality of servers, or a cloud computing center.

The user terminal 110 is configured to collect a target image of a human body part of a target contact and provide the target image to the server 120 when instructed by a user who logs in to the social network from the social application client on the respective user terminal 110. The user terminal 110 uses a camera to capture a target video of the human body part of the target contact and selects a target image satisfying a set (predefined) requirement from the target video after the user terminal 110 receives a selection instruction triggered by the user in the social application client instructing to add contacts by scanning a human body part. Alternatively, the camera is used to capture a target image of a human body part of the target contact after receiving a selection instruction instructing to add contacts by shooting an image of the human body part. Alternatively, a target image of a human body part uploaded to the social application by the target contact is directly obtained.

The server 120 is configured to: receive the target image and extract a target biological feature (biometric feature) from the target image; match the target biological feature with prestored reference biological features to determine a reference biological feature with the highest similarity and satisfying a threshold requirement; and obtain a social account corresponding to (or associated with) the determined reference biological feature and add the obtained social account that is a social account of the target contact. For example, the obtained social account is added to a friend list of the user who logs in to the social network from the social application client on the respective user terminal 110. In some examples, when adding the social account, a user identity (ID), a user name, an account ID, an account number, and the like, which can be used to identify the target contact or the social account of the target contact in the social network, is added to the friend list.

Further, the server 120 is configured to: obtain locations of each user terminal; obtain online social accounts (referring to social accounts of users who have logged in to the social network) of user terminals in a set (predefined) area coverage (for example, an area neighboring or surrounding the user terminal 110 that transmitted the target image to the server 120) according to locations of each user terminal and use the obtained online social accounts as candidate social accounts; and obtain reference biological features of each candidate social account according to the correspondence between prestored social accounts and reference biological features. The target biological feature can be matched with the obtained reference biological features of each candidate social account to determine a matched reference biological feature.

Further, each user terminal 110 may obtain a reference image of a human body part of a user after the user logs in the social network and provide the reference image to the server 120.

Accordingly, the server 120 may be further configured to: receive the reference image and extract a reference biological feature from the reference image; and establish and store a correspondence between a social account of the user in the social network and the reference biological feature.

Figure 2:
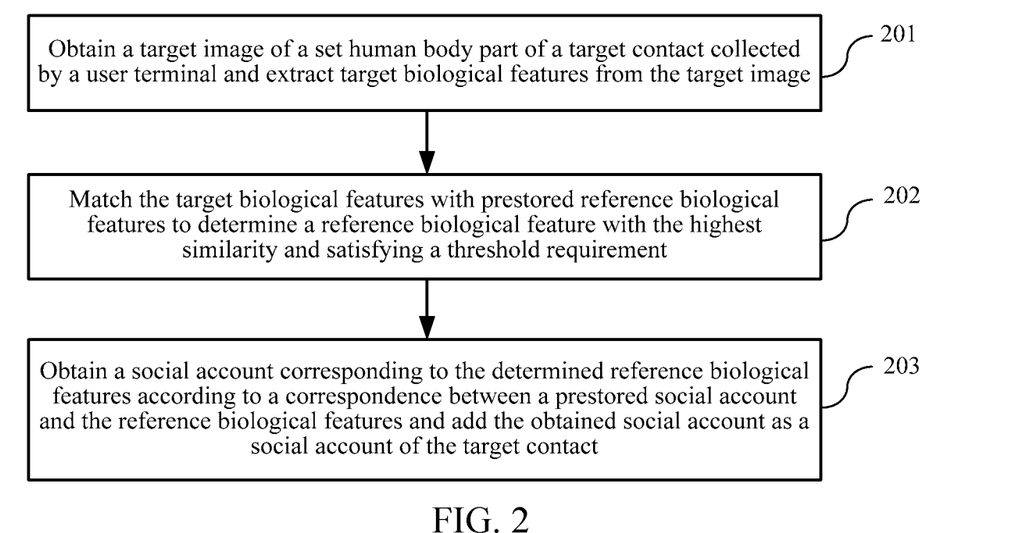
FIG. 2 is an exemplary flowchart of a method for adding contacts in a social network according to an embodiment of this application.

FIG. 2 is an exemplary flowchart of a method for adding contacts in a social network according to an embodiment of this application. The method is mainly applied to a server 120 in the implementation environment shown in FIG. 1. As shown in FIG. 2, the method includes the following steps:

Step 201: Obtain a target image of a set human body part (e.g., a human body part that is set or selected by a user in an application client or specified in the application client) of a target contact received from and collected by a user terminal and extract a target biological feature(s) from the target image.

The set human body part may be a part that can reflect different biological features among individuals, such as a human face, a fingerprint, an iris, an eye print, or the like.

In this step, the target image may be an image of the set human body part of the target contact directly shot by a camera of the user terminal, or may be an image satisfying a predefined quality requirement and selected from a video after the user terminal uses the camera to shoot the video of the set human body part of the target contact, or may further be an image of the set human body part sent by the target contact and received by a social application by the user terminal. The following respectively gives descriptions by using an example.

For example, the user terminal may first receive a selection instruction triggered by a user in the social application used for instructing to add contacts by scanning an image of a human body part. Further, the user terminal uses the camera to directly collect the image of the set human body part of the target contact and sends the shot target image to a server after encryption. In an implementation, the user may be instructed to shoot an image of the target contact that has an appropriate size, a good gesture, and good illumination.

For another example, the user terminal may further first receive a selection instruction triggered by the user in the social application and used for instructing to add contacts by scanning the human body part and use the camera to shoot a target video of the set human body part of the target contact. Further, the user terminal selects a target image satisfying a set requirement from a target video sequence and sends the selected target image to the server after the encryption. In an implementation, when selecting the target image satisfying the set requirement, an image in which the set human body part is in a middle, the width is close to two thirds of the width of the image, a posture is almost facing front, and an illumination evaluation score is relatively high may be selected.

In addition, for the foregoing two cases in which the set human body part of the target contact is directly shot, in an implementation, a living identification technology is used to verify the shot image or video for purpose of anti-spoofing.

For another example, the user terminal may directly obtain a target image of the set human body part uploaded to the social application by the target contact. For example, the user of the user terminal may long press an image sent to a Wechat group by the target contact to pop up a menu including "recognizing a contact of the image" and select the item to trigger recognition of the target image and extraction of biological features.

The server performs encryption after receiving the target image sent by the user terminal and extracts the biological features from the target image. Specifically, technologies such as deep neural networks may be used to extract the biological features.

Step 202: Match the target biological features with prestored reference biological features to determine a reference biological feature with the highest similarity and satisfying a threshold requirement.

In this step, a database prestores the reference biological features and a correspondence between a social account of a user and the reference biological features, so as to implement a purpose of determining a social account of a target contact by matching the target biological features of the target contact.

There are a plurality of methods to obtain the reference biological features of the user. For example, after the user logs in a social network, a reference image of a set human body part can be obtained. The reference image may be a stored image shot before or may be an image satisfying a set quality requirement shot under a user interaction instruction. For example, the user is instructed to shoot an image of the target contact that has an appropriate size, a good gesture, and good illumination. A server may extract the reference biological features from the reference image after receiving the foregoing reference image. Specifically, technologies such as deep neural networks may further be used to extract the biological features.

Later, the reference biological features and a social account of the user when logging in the social network are bound together and written in the database.

When matching the target biological features and the reference biological features, the reference biological features may be matched with the reference biological features of the user stored in the database one by one to determine a reference biological feature with the highest similarity. Alternatively, to reduce calculation cost of matching and save system resources, a matching range (e.g., a size of candidate reference features) may be reduced in an implementation of this application. For example, given that a to-be-added target contact is generally close to a contact adding requester, the server may further obtain location information of each user terminal, so as to obtain an online social account of the user terminal in a set area coverage (for example, an area coverage close to the user terminal of the contact adding requester) according to the location information of each user terminal and use the obtained online social account as a candidate social account, and obtain reference biological features of each candidate social account according to a correspondence between a prestored social account and the reference biological features, so as to match the target biological features with the obtained reference biological features of each candidate social account to determine the reference biological feature with the highest similarity.

In a case in which the user terminal is a mobile terminal, positioning information of a location based service (LBS) of the mobile terminal may be used to obtain the location information of each user terminal. In a case in which the user terminal is a fixed terminal, IP address information of the fixed terminal may be used to obtain the location information of each user terminal.

After determining the reference biological feature with the highest similarity, whether a similarity value is higher than a set threshold can be further determined. If the similarity value is higher than the set threshold, perform step 203 to determine a social account corresponding to the reference biological feature as a social account of the target contact, otherwise, instruction information used for instructing not finding an identity of the target contact is fed back to the user terminal. In this case, the user can recollect an image of the set human body part of the target contact or choose other methods to add friends.

Step 203: Obtain a social account corresponding to the determined reference biological feature according to a correspondence between a prestored social account and the reference biological features and add the obtained social account as a social account of the target contact.

In this step, after determining the social account of the target contact, a private setting of the social account may be determined. The social account is directly added as a friend when a private setting of the social account allows direct adding. A friend request message is sent to the target contact asking for an authorization when the private setting of the social account does not allow the direct adding. The social account is added as a friend when determination corresponding to the social account (e.g., an authorization) is received.

Figure 3:
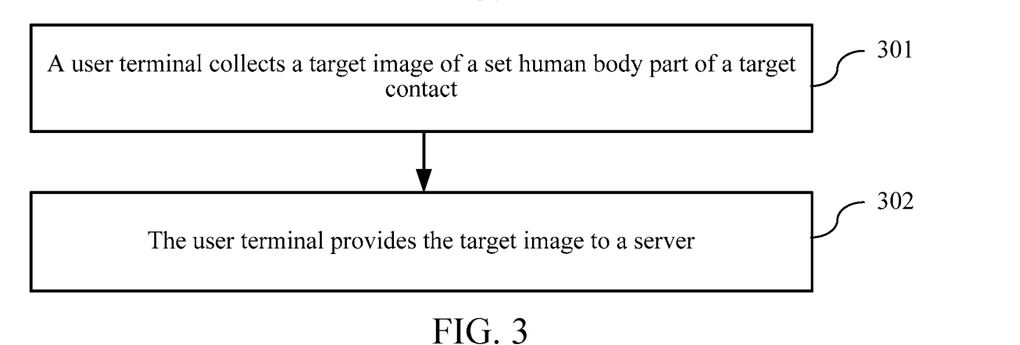
FIG. 3 is an exemplary flowchart of another method for adding contacts in a social network according to an embodiment of this application.

FIG. 3 is an exemplary flowchart of another method for adding contacts in a social network according to an embodiment of this application. The method is mainly applied to a user terminal 110 in the implementation environment shown in FIG. 1. As shown in FIG. 3, the method includes the following steps:

Step 301: A user terminal collects a target image of a set human body part of a target contact.

The set human body part may be a part that can reflect different biological features among individuals, such as a human face, a fingerprint, an iris, and an eye print.

In this step, the target image may be an image of the set human body part of the target contact directly shot by a camera by the user terminal, or may be an image satisfying a set quality requirement and selected from a video after the user terminal uses the camera to shoot the video of the set human body part of the target contact, or may further be an image of the set human body part sent by the target contact and received by a social application by the user terminal. The following respectively gives descriptions by using an example.

For example, the user terminal may first receive a selection instruction triggered by a user in the social application and used for instructing to add contacts by scanning an image of a human body part. Further, the user terminal uses the camera to directly collect the image of the set human body part of the target contact. In an implementation, the user may be instructed to shoot an image of the target contact that has an appropriate size, a good gesture, and good illumination.

For another example, the user terminal may further first receive a selection instruction triggered by the user in the social application and used for instructing to add contacts by scanning the human body part and use the camera to shoot a target video of the set human body part of the target contact. Further, the user terminal selects a target image satisfying a set requirement from a target video sequence. In an implementation, when selecting the target image satisfying the set requirement, an image in which the set human body part is in a middle, the width is close to two thirds of the width of the image, a posture is almost facing front, and an illumination evaluation score is relatively high may be selected.

In addition, for the foregoing two cases in which the set human body part of the target contact is directly shot, in an implementation, a living identification technology is used to identify the shot image or video.

For another example, the user terminal may directly obtain a target image of the set human body part uploaded to the social application by the target contact. For example, the user of the user terminal may long press an image sent to a Wechat group by the target contact to pop up a menu including "recognizing a contact of the image" and select the item to trigger recognition of the target image and extraction of biological features.

Step 302: The user terminal provides the target image to a server.

After the server receives the target image, a method procedure shown in FIG. 2 can be performed. That is, the server may: extract target biological features from the target image and match the target biological features with prestored reference biological features to determine a reference biological feature with the highest similarity and satisfying a threshold requirement; and obtain a social account corresponding to the determined reference biological feature according to a correspondence between a prestored social account and the reference biological features and add the obtained social account as a social account of the target contact.

Corresponding to the method shown in FIG. 2, after a user logs in the social network, the user terminal may obtain a reference image of a set human body part of a user. For example, the user terminal may obtain the reference image of the set human body part of the user after receiving a selection instruction triggered by the user in a social application and used for instructing to upload the reference image. The reference image may be a stored image shot before or may be an image satisfying a set quality requirement shot under a user interaction instruction. For example, the reference image of the set human body part of the user may be obtained by using a camera and the user is instructed by the user interaction instruction to shoot an image of the target contact that has an appropriate size, a good gesture, and good illumination. A server may extract the reference biological features from the reference image after receiving the foregoing reference image. Specifically, technologies such as deep neural networks may further be used to extract the biological features. Later, the server may establish and store a correspondence between a social account of the user in the social network and the reference biological features.

Corresponding to the method shown in FIG. 2, the user terminal may further send location information of the user terminal to the server, so that the server obtains an online social account of the user terminal in a set area coverage according to the location information of each user terminal; and obtain reference biological features of each online social account according to the correspondence between the prestored social account and the reference biological features, so as to match the target biological features with the obtained reference biological features of each online social account.

Figure 4:
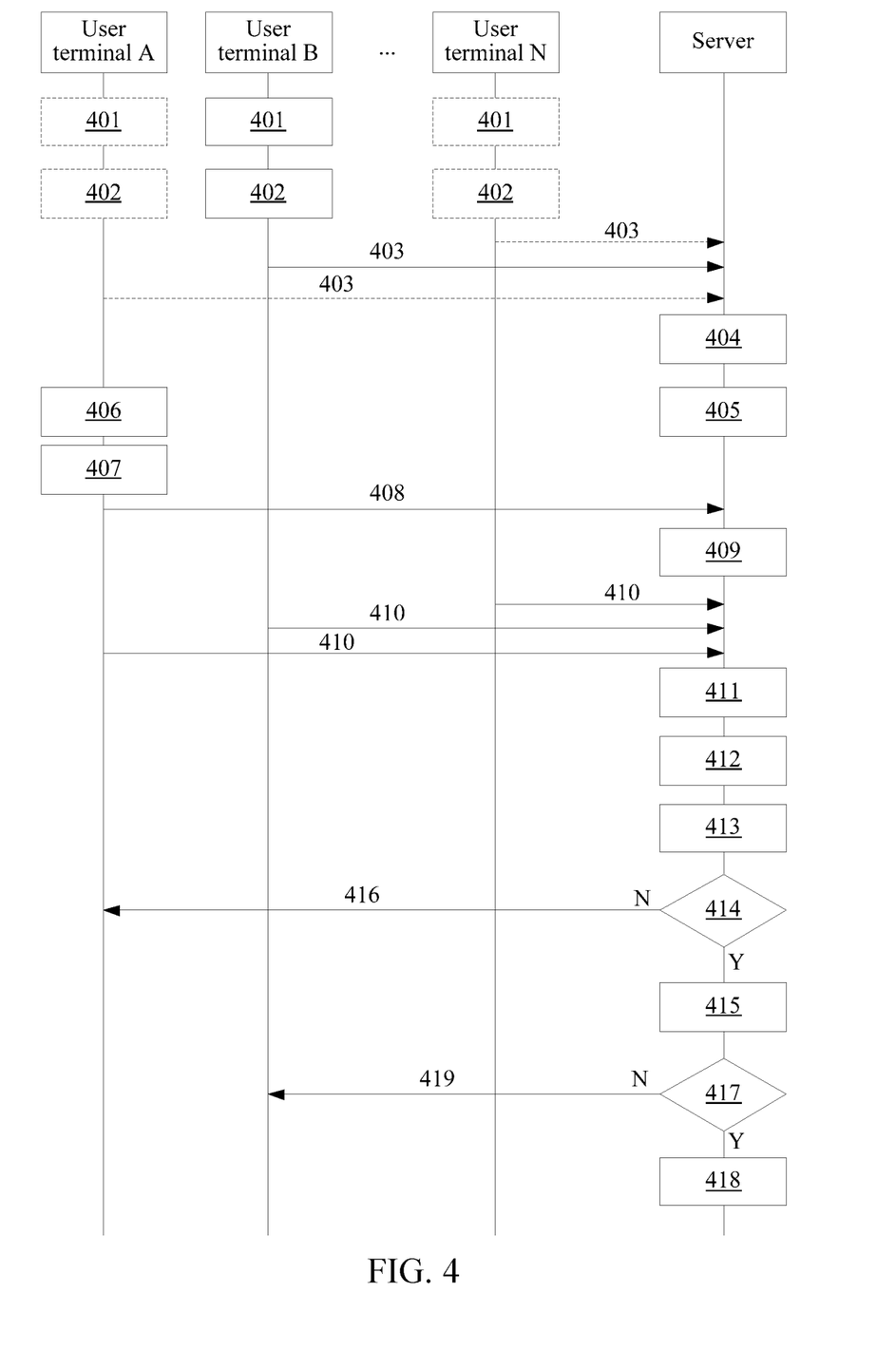
FIG. 4 is a schematic flowchart of a method for adding contacts in a social network according to an example of this application.

FIG. 4 is a schematic flowchart of a method for adding contacts in a social network according to an application example of this application. The method can be applied in the implementation environment shown in FIG. 1. As shown in FIG. 4, the method includes the following procedure:

Step 401: A user terminal receives a selection instruction triggered in a social application after a user logs in a social network and used for instructing to upload a reference image.

Step 402: The user terminal obtains the reference image of a set human body part of the user. The reference image may be a stored image shot before or may be an image satisfying a set quality requirement shot under a user interaction instruction.

Step 403: The user terminal provides the reference image to a server.

Step 404: The server extracts reference biological features from the reference image.

Step 405: The server correspondingly stores the reference biological features and a social account of the user in the social network.

In FIG. 4, users of a user terminal A to a user terminal N can interact with the server to perform the foregoing step 401 to step 405, so as to store the reference biological features of the set human body part of each user.

Step 406: The user terminal receives a selection instruction triggered by the user in the social application and used for instructing to add contacts by scanning a human body part.

In FIG. 4, it is assumed that the user terminal A receives a contact adding request from the user.

Step 407: The user terminal uses a camera to shoot a target video of the set human body part of a target contact and selects a target image satisfying a set requirement from a target video sequence.

In FIG. 4, it is assumed that the target contact is a user of the user terminal B.

Step 408: The user terminal provides the target image to the server.

Step 409: The server extracts target biological features from the target image.

Step 410: The server obtains location information of each user terminal.

Step 411: The server obtains an online social account of the user terminal in a set area coverage according to the location information of each user terminal and uses the obtained online social account as a candidate social account.

Step 412: The server obtains reference biological features of each candidate social account according to the social account and the reference biological features correspondingly stored in a database.

Step 413: The server matches the target biological features with the obtained reference biological features of each candidate social account to determine a reference biological feature with the highest similarity.

Step 414: The server determines whether a similarity value is higher than a set threshold. If the similarity value is higher than the set threshold, perform step 415, otherwise, perform step 416.

Step 415: Determine a social account corresponding to the reference biological features as a social account of the target contact.

Step 416: Feedback instruction information used for instructing not finding an identity of the target contact to the user terminal.

Step 417: The server determines whether a private setting of the social account allows direct adding. If the private setting of the social account allows direct adding, perform step 418, otherwise, perform step 419.

Step 418: Directly add the social account as a friend.

Step 419: Send a friend request message to the social account and add the social account as a friend when receiving determination corresponding to the social account.

Figure 5:
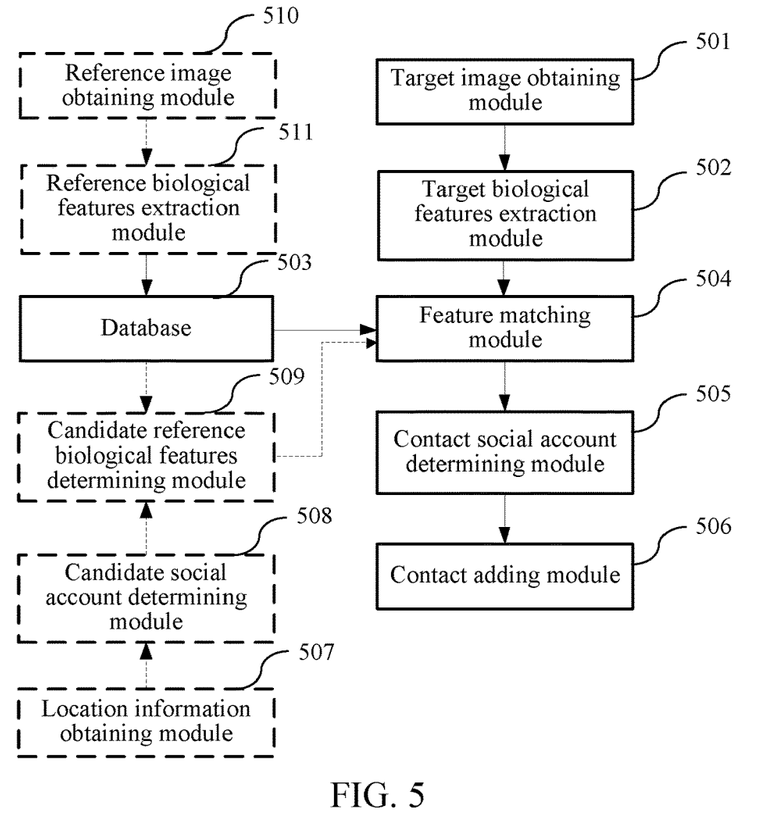
FIG. 5 is an exemplary structural diagram of a device for adding contacts in a social network according to an embodiment of this application.

FIG. 5 is an exemplary structural diagram of a device for adding contacts in a social network according to an embodiment of this application. The device may be applied to a server of the implementation environment shown in FIG. 1 and be configured to implement the method shown in FIG. 2. Details undisclosed in the embodiments of the device may refer to descriptions in the embodiments of the method in FIG. 2. As shown in FIG. 5, the device may include: a target image obtaining module 501, a target biological features extraction module 502, a database 503, a feature matching module 504, a contact social account determining module 505, and a contact adding module 506.

The target image obtaining module 501 is configured to obtain a target image of a set human body part of a target contact collected by a user terminal.

The target biological features extraction module 502 is configured to extract target biological features from the target image.

The database 503 is configured to store reference biological features and a correspondence between the reference biological features and a social account.

The feature matching module 504 is configured to match the target biological features with the reference biological features stored in the database 503 to determine a reference biological feature with the highest similarity and satisfying a threshold requirement.

The contact social account determining module 505 is configured to obtain the social account corresponding to the determined reference biological feature according to the correspondence between the social account stored in the database 503 and the reference biological features and add the social account as a social account of the target contact.

The contact adding module 506 is configured to add the social account of the target contact as a friend.

Corresponding to the method shown in FIG. 2, the device may further include: a location information obtaining module 507, a candidate social account determining module 508, and a candidate reference biological features determining module 509.

The location information obtaining module 507 is configured to obtain location information of each user terminal.

The candidate social account determining module 508 is configured to obtain an online social account of the user terminal in a set area coverage according to the location information of each user terminal and use the obtained online social account as a candidate social account.

The candidate reference biological features determining module 509 is configured to obtain reference biological features of each candidate social account according to the correspondence between the social account stored in the database and the reference biological features.

The feature matching module 504 is configured to match the target biological features with the reference biological features of each candidate social account obtained by the candidate reference biological features determining module 509.

Corresponding to the method shown in FIG. 2, the device may further include: a reference image obtaining module 510 and a reference biological features extraction module 511.

The reference image obtaining module 510 is configured to receive a reference image of the set human body part of a user obtained by the user terminal after the user logs in the social network.

The reference biological features extraction module 511 is configured to extract the reference biological features from the reference image and correspondingly store the reference biological features and a social account of the user in the social network in the database 503.

Corresponding to the method shown in FIG. 2, the contact adding module 506 may be configured to: directly add the social account as a friend when a private setting of the social account allows direct adding; send a friend request message to the social account when the private setting of the social account does not allow the direct adding; and add the social account as a friend when receiving determination corresponding to the social account.

Figure 6:
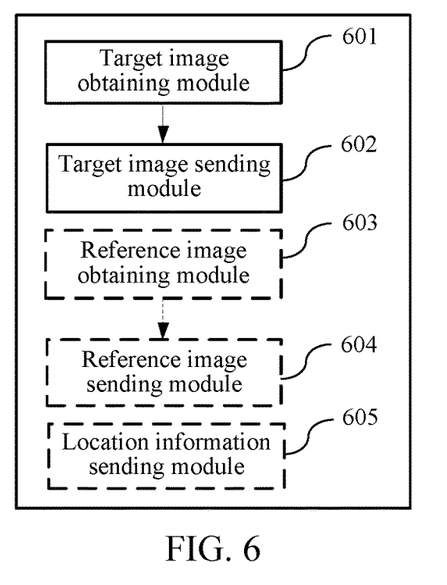
FIG. 6 is an exemplary structural diagram of another device for adding contacts in a social network according to an embodiment of this application.

FIG. 6 is an exemplary structural diagram of another device for adding contacts in a social network according to an embodiment of this application. The device may be applied to a user terminal of the implementation environment shown in FIG. 1 and be configured to implement the method shown in FIG. 3. Details undisclosed in the embodiments of the device may refer to descriptions in the embodiments of the method in FIG. 3. As shown in FIG. 6, the device may include: a target image obtaining module 601 and a target image sending module 602.

The target image obtaining module 601 is configured to collect a target image of a set human body part of a target contact. Specifically, the target image obtaining module 601 may use a camera to shoot a target video of the set human body part of the target contact and select a target image satisfying a set requirement from a target video sequence after receiving a selection instruction triggered by a user in a social application and used for instructing to add contacts by scanning a human body part, or may use the camera to shoot the target image of the set human body part of the target contact after receiving a selection instruction triggered by the user in the social application and used for instructing to add contacts by shooting an image of the human body part, or may directly obtain a target image of the set human body part uploaded to the social application by the target contact.

The target image sending module 602 is configured to: provide the target image to a server, so that the server extracts target biological features from the target image; match the target biological features with prestored reference biological features to determine a reference biological feature with the highest similarity and satisfying a threshold requirement; and obtain a social account corresponding to the determined reference biological feature according to a correspondence between a prestored social account and the reference biological features and add the obtained social account as a social account of the target contact.

Corresponding to the method shown in FIG. 3, the target image obtaining module 601 may have multiple implementation forms. For example, in an implementation, the target image obtaining module 601 may specifically include a first instruction receiving submodule (not shown in the figure), a video shooting submodule (not shown in the figure), and an image selection submodule (not shown in the figure).

The first instruction receiving submodule is configured to receive a selection instruction triggered by a user in a social application and used for instructing to add contacts by scanning a human body part.

The video shooting submodule is configured to use a camera to shoot a target video of the set human body part of the target contact.

The image selection submodule is configured to select a target image satisfying a set requirement from a target video sequence.

For another example, in another implementation, the target image obtaining module 601 may further specifically include a second instruction receiving submodule (not shown in the figure) and an image shooting submodule (not shown in the figure).

The second instruction receiving submodule is configured to receive a selection instruction triggered by the user in the social application and used for instructing to add contacts by shooting an image of the human body part.

The image shooting submodule is configured to use a camera to shoot a target image of the set human body part of the target contact.

Corresponding to the method shown in FIG. 3, the device may further include: a reference image obtaining module 603 and a reference image sending module 604.

The reference image obtaining module 603 is configured to obtain a reference image of the set human body part of a user after the user logs in the social network.

The reference image sending module 604 is configured to: provide the reference image to the server, so that the server extracts the reference biological features from the reference image; and establish and store a correspondence between a social account of the user in the social network and the reference biological features.

The reference image obtaining module 603 may have multiple implementation forms. For example, in an implementation, the reference image obtaining module 603 may specifically include a third instruction receiving submodule (not shown in the figure) and an image obtaining submodule (not shown in the figure).

The third instruction receiving submodule is configured to receive a selection instruction triggered by the user in the social application and used for instructing to upload the reference image.

The image obtaining submodule is configured to obtain the reference image of the set human body part of the user. The reference image may be a stored image shot before or may be an image satisfying a set quality requirement shot under a user interaction instruction.

Corresponding to the method shown in FIG. 3, the device may further include a location information sending module 605, configured to: send location information of the user terminal to the server, so that the server obtains an online social account of the user terminal in a set area coverage according to the location information of each user terminal; and obtain reference biological features of each online social account according to the correspondence between the pre-stored social account and the reference biological features, so as to match the target biological features with the obtained reference biological features of each online social account.

A database in this application may be a database disposed in the server 120, or may be an independent database disposed outside the server 120.

In addition, each embodiment of this application may be implemented by a data processing program executed by a data processing device such as a computer. Apparently, the data processing program constitutes this application. In addition, generally, a data processing program stored in a storage medium is directly read from the storage medium for execution or the program is installed on or replicated to a storage device (such as a hard disk or memory) of a data processing device for execution. Therefore, such a storage medium also constitutes this application. The storage medium may use any type of recording manner, such as a paper storage medium (such as a paper tape), a magnetic storage medium (such as a soft disk, a hard disk, or a flash memory), an optical storage medium (such as a CD-ROM), or a magneto-optical storage medium (such as an MO).

In addition, it should be noted that the program code read from the storage medium may also be written to a memory that is disposed in an extension board inserted in the computer, or may be written to a memory that is disposed in an extension unit connected to the computer, and then a processor or the like that is installed on the extension board or extension unit may be enabled to execute some or all actual operations based on instructions of the program code, so as to implement the functions of any embodiment in the foregoing embodiments. The processor may include one or more than one processing core.

Figure 7:
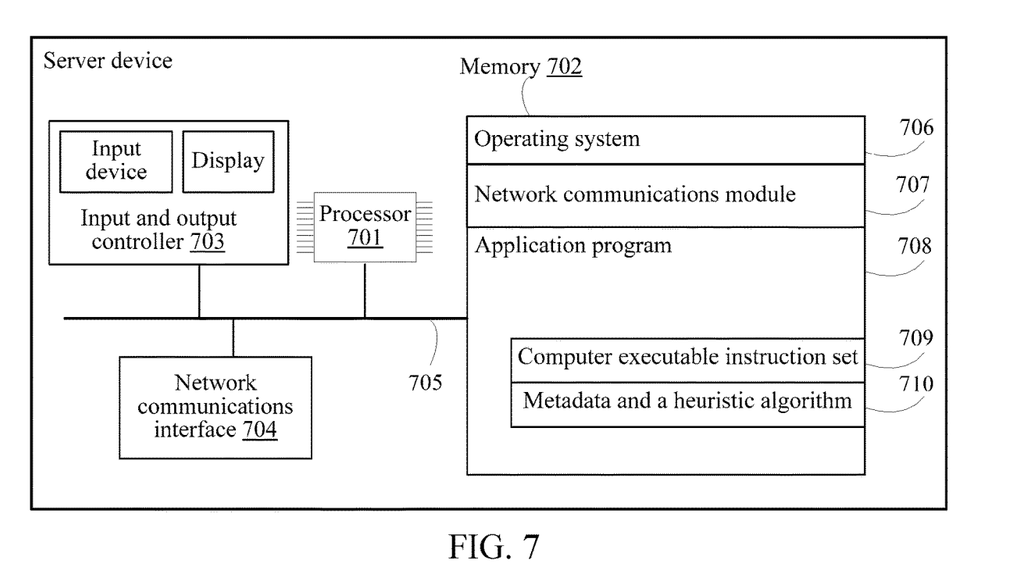
FIG. 7 is a schematic structural diagram of a server device according to an embodiment of this application.

For example, FIG. 7 is a schematic structural diagram of a server device according to an embodiment of this application. The user terminal may be configured to implement the method in FIG. 2 and the device in FIG. 5. As shown in FIG. 7, the server device may include: processing circuitry such as a processor 701, a non-volatile computer readable memory 702, an input and output controller 703, and a network communications interface 704. These components perform communication through a bus 705.

In this embodiment, the memory 702 stores multiple program modules, such as an operating system 706, a network communications module 707, and an application program 708.

The processor 701 can read various modules (not shown in the figure) in the application program in the memory 702 to process various function applications and data processing of the server device. The processor 701 in this embodiment may be one or more, and may be a CPU, a processing unit/module, an application specific integrated circuit (ASIC), a logical module, a programmable gate array, or the like.

The input and output controller 703 has a display and an input device configured to complete inputting, outputting, and displaying of related data.

The operating system 706 includes, but is not limited to: an Android operating system, a Symbian operating system, a Windows operating system, a Linux operating system, or the like.

The application program 708 may include each function module in the device in FIG. 5. These function modules may be a computer executable instruction set 709 executed by the processor 701, corresponding metadata and a heuristic algorithm 710.

In this embodiment, the network communications interface 704 matches with the network communications module 707 to complete transaction of network signals of the server device, including transmitting and network data interaction of target image data and reference image data with the user terminal.

Figure 8:
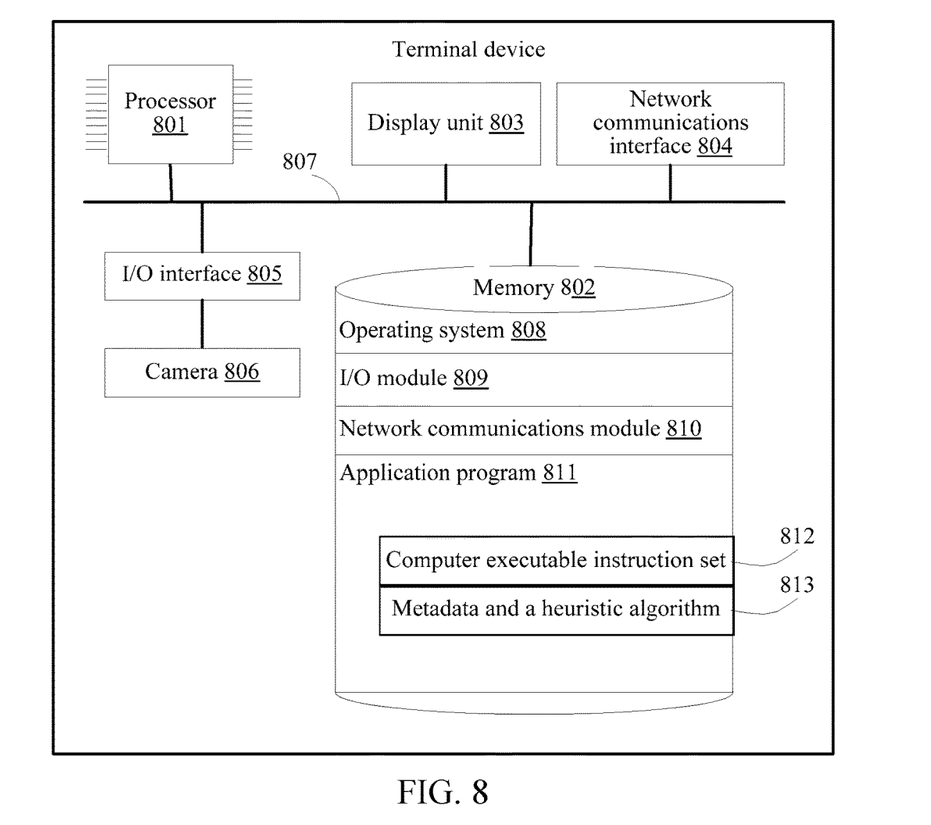
FIG. 8 is a schematic structural diagram of a user terminal according to an embodiment of this application.

For another example, FIG. 8 is a schematic structural diagram of a user terminal according to an embodiment of this application. The user terminal may be configured to implement the method in FIG. 3 and the device in FIG. 6. As shown in FIG. 8, the user terminal may include: processing circuitry such as a processor 801, a non-volatile computer readable memory 802, a display unit 803, and a network communications interface 804, an I/O interface 805, and a camera 806. These components perform communication through a bus 807.

In this embodiment, the memory 802 stores multiple program modules, such as an operating system 808, an I/O module 809, a network communications module 810, and an application program 811.

The processor 801 can read various modules included in the application program 811 in the memory 802 to process various function applications and data processing of the user terminal. The processor 801 in this embodiment may be one or more, and may be a CPU, a processing unit/module, an application specific integrated circuit (ASIC), a logical module, a programmable gate array, or the like.

The operating system 808 includes, but is not limited to: an Android operating system, a Windows operating system, an Apple iOS operating system, or the like.

The application program 811 may include each function module in the device in FIG. 5 and form a corresponding computer executable instruction set 812, corresponding metadata and a heuristic algorithm 813. These computer executable instruction sets may be executed by the processor 801 to execute and complete the method shown in FIG. 3 or the functions of the device shown in FIG. 5.

In this embodiment, the network communications interface 804 matches with the network communications module 810 to complete transaction of network signals of the user terminal, including transmitting and network data interaction of target image data and reference image data with the server.

The display unit 803 has a display panel, configured to complete inputting and displaying of related information, including receiving a selection instruction of a user.

In the embodiment of this application, the I/O interface 805 connects to the camera 806. In addition, there are other I/O interfaces configured to connect to other input/output devices, such as a touch panel (for example, a touch screen). The I/O interface 805 sends the target image data or the reference image data received by the camera 806 to the I/O module 809 to process.

In the embodiments of this application, the method includes: obtaining a target image of a set human body part (for example, a human face) of a target contact collected by a user terminal and extracting target biological features from the target image; matching the target biological features with prestored reference biological features to determine a reference biological feature with the highest similarity and satisfying a threshold requirement; and obtaining a social account corresponding to the determined reference biological feature according to a correspondence between a prestored social account and the reference biological features and adding the obtained social account as a social account of the target contact. Further, location based services (LBS) information provided by the social application can be used to determine identities of nearby social users and these identities are used as a candidate identity cluster. Use that the set human body part is a human face as an example. A reliable identity can be recognized from the candidate identity cluster by using a facial recognition technology. Currently, the facial recognition technology can implement 99% user recognition rate in a case in which an error rate is controlled in one in a hundred thousand, thereby ensuring accuracy of identity recognition in a large degree. In addition, a current facial recognition algorithm is fast and a whole face-scanning process can be completed in one second, thereby vastly superior to a related method to add friends by inputting accounts. Compared with the related method to add friends, technical solutions in this application have advantages of being fast and convenient without memory. The method is particularly appropriate to use for people inconvenient to perform manual inputting such as old people, the disabled, and children.

The above descriptions are merely exemplary embodiments of this application, but are not intended to limit this application. Any modification, equivalent replacement, or improvement made without departing from the spirit and principle of this application shall fall within the protection scope of this application.

What is claimed is:

1. A method for adding a target contact to a user's friend list in a social network, comprising:
   receiving, by circuitry of an information processing apparatus, a target image of a human body part of the target contact from a first user terminal in which a request to add a contact by using the target image was received;
   extracting, by the circuitry of the information processing apparatus, a target biological feature from the target image;
   determining, by the circuitry of the information processing apparatus, whether the target biological feature matches a reference biological feature of a plurality of prestored reference biological features;
   determining, by the circuitry of the information processing apparatus, a social account associated with the determined reference biological feature that matches the target biological feature; and
   in response to the determination of the social account associated with the determined reference biological feature, automatically adding, by the circuitry of the information processing apparatus, the determined social account of the target contact to the user's friend list.

2. The method according to claim 1, further comprising:
   obtaining location information of user terminals of users of the social network;
   obtaining one or more online social accounts of the users of the user terminals located within an area neighboring the first user terminal according to the obtained location information; and
   obtaining reference biological features from the plurality of prestored reference biological features that are associated with the one or more online social accounts,
   wherein the determining whether the target biological feature matches the reference biological feature of the plurality of prestored reference biological features includes determining whether the target biological feature matches one of the obtained reference biological features that are associated with the one or more online social accounts.

3. The method according to claim 1, wherein the target image of the human body part of the target contact received from the first user terminal is one of:
   a target image satisfying a predefined requirement and selected from a video sequence of the human body part captured by the first user terminal;
   a target image of the human body part of the target contact captured by the first user terminal; or
   a target image of the human body part uploaded to the social network by the target contact and obtained by the first user terminal.

4. The method according to claim 1, further comprising:
   receiving a reference image of a human body part of a user from the first user terminal;
   extracting a user account reference biological feature from the reference image; and
   establishing and storing an association between a social account of the user and the user account reference biological feature.

5. The method according to claim 4, wherein the reference image satisfies a predefined requirement.

6. The method according to claim 1, wherein the adding the determined social account of the target contact includes one of:
  adding the social account to the user's friend list when a private setting of the social account allows direct adding; or
  sending a friend request message to the target contact asking for an authorization when the private setting of the social account does not allow the direct adding, and
  adding the social account to the user's friend list in response to receiving the authorization from the target contact.

7. The method according to claim 1, wherein the plurality of prestored reference biological features are reference biological features of user terminals neighboring the first user terminal.

8. The method according to claim 1, wherein the determining whether the target biological feature matches the reference biological feature of the plurality of prestored reference biological features includes:
  determining one of the plurality of prestored reference biological features that matches the target biological feature with a highest similarity, the highest similarity satisfying a threshold requirement.

9. A non-transitory computer-readable medium storing a program executable by a processor to perform:
  receiving, in a first user terminal, a request to add a contact by using a target image;
  collecting, by the first user terminal, the target image of a human body part of a target contact to be added to a user's friend list in a social network; and
  providing, by the first user terminal, the target image to a server, wherein the server extracts a biological feature from the target image, determines a social account associated with the extracted biological feature based on a database storing associations between biological features and respective associated social accounts, and, in response to the determination of the social account associated with the extracted biological feature, automatically adds the determined social account to the user's friend list.

10. The non-transitory computer-readable medium according to claim 9, wherein the program is executable by the processor to perform one of:
  capturing via a camera a video of the human body part of the target contact and selecting the target image satisfying a predefined requirement from the video;
  capturing via the camera the target image of the human body part of the target contact; or
  obtaining the target image of the human body part uploaded to the social network by the target contact.

11. The non-transitory computer-readable medium according to claim 9, wherein the program is executable by the processor to perform:
  obtaining, by the first user terminal, a reference image of a human body part of a user after the user logs in the social network; and
  providing, by the first user terminal, the reference image to the server, wherein the server extracts a reference biological feature from the reference image, and stores an association between a social account of the user in the social network and the reference biological feature.

12. The non-transitory computer-readable medium according to claim 9, wherein the program is executable by the processor to perform:
  sending, by the first user terminal, location information of the first user terminal to the server, wherein the server obtains online social accounts of user terminals neighboring the first user terminal, and determines whether biological features associated with the obtained online social accounts match the extracted biological feature to determine the social account to be added to the user's friend list.

13. An information processing apparatus, comprising circuitry configured to:
  receive a target image of a human body part of a target contact from a first user terminal in which a request to add a contact by using the target image was received;
  extract a target biological feature from the target image;
  determine whether the target biological feature matches a reference biological feature of a plurality of prestored reference biological features;
  determine a social account associated with the determined reference biological feature that matches the target biological feature; and
  in response to the determination of the social account associated with the determined reference biological feature, automatically add the determined social account of the target contact to a user's friend list in a social network.

14. The information processing apparatus according to claim 13, wherein the circuitry is further configured to:
  obtain location information of user terminals of users of the social network;
  obtain one or more online social accounts of the users of the user terminals located within an area neighboring the first user terminal according to the obtained location information;
  obtain reference biological features from the plurality of prestored reference biological features that are associated with the one or more online social accounts; and
  determine whether the target biological feature matches one of the obtained reference biological features that are associated with the one or more online social accounts.

15. The information processing apparatus according to claim 13, wherein the target image of the human body part of the target contact received from the first user terminal is one of:
  a target image satisfying a predefined requirement and selected from a video sequence of the human body part captured by the first user terminal;
  a target image of the human body part of the target contact captured by the first user terminal; or
  a target image of the human body part uploaded to the social network by the target contact and obtained by the first user terminal.

16. The information processing apparatus according to claim 13, wherein the circuitry is further configured to:
  receive a reference image of a human body part of a user from the first user terminal;
  extract a user account reference biological feature from the reference image; and
  establish and store an association between a social account of the user and the user account reference biological feature.

17. The information processing apparatus according to claim 16, wherein the reference image satisfies a predefined requirement.

18. The information processing apparatus according to claim 13, wherein the circuitry is further configured to:

add the social account to the user's friend list when a private setting of the social account allows direct adding; or send a friend request message to the target contact asking for an authorization when the private setting of the social account does not allow the direct adding, and add the social account to the user's friend list in response to receiving the authorization from the target contact.

19. The information processing apparatus according to claim 13, wherein the plurality of prestored reference biological features are reference biological features of user terminals neighboring the first user terminal.

20. The information processing apparatus according to claim 13, wherein the circuitry is further configured to:

determine one of the plurality of prestored reference biological features that matches the target biological feature with a highest similarity, the highest similarity satisfying a threshold requirement.

* * * * *